Jan. 15, 1957    F. P. SCHWIEG ET AL    2,777,326
ELECTRICAL TEMPERATURE MEASURING APPARATUS
Filed March 20, 1953
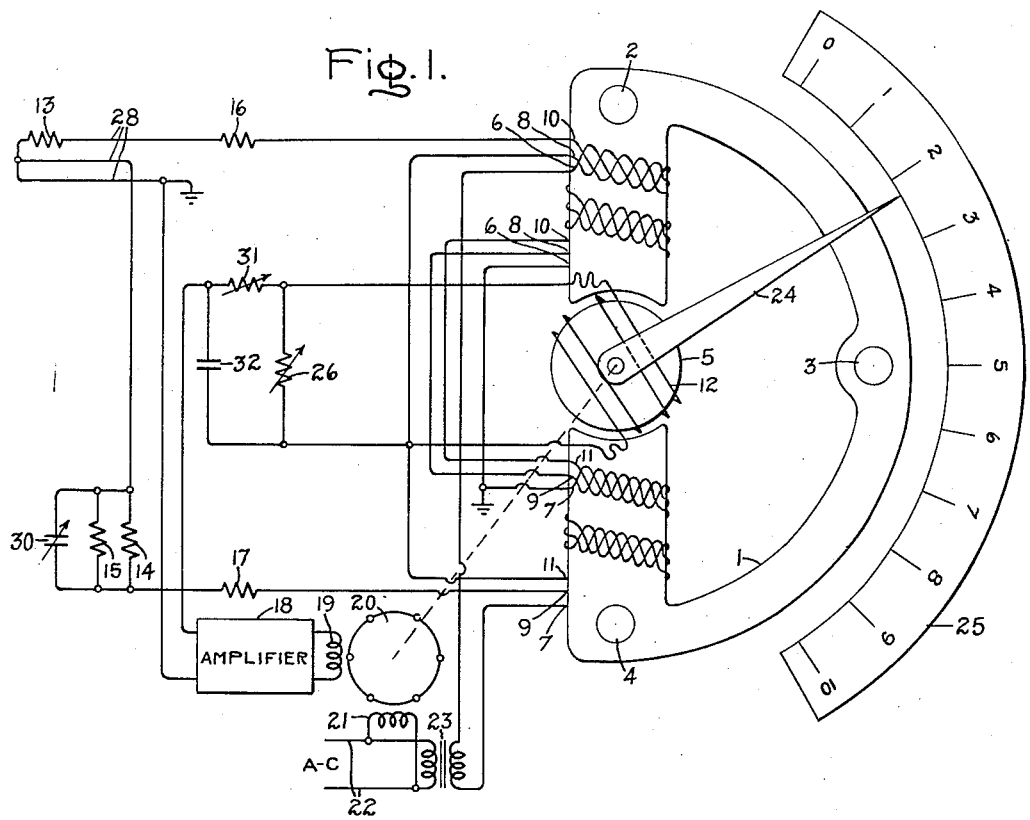
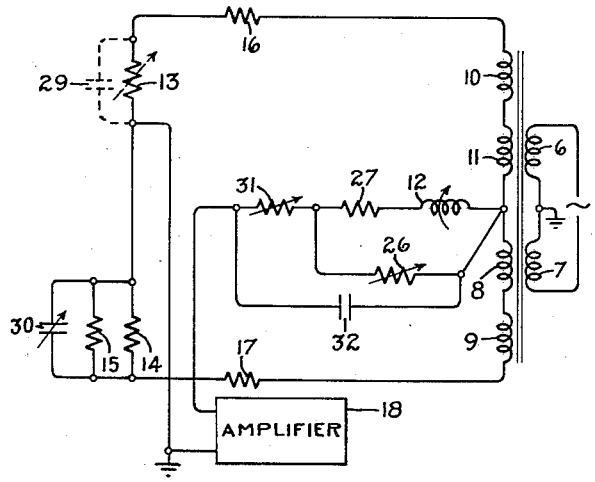
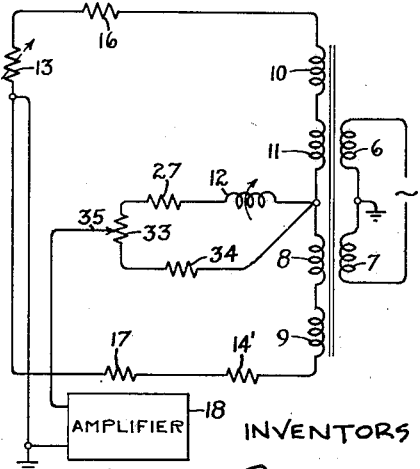
INVENTORS
FREDERIC P. SCHWIEG
ALBERT HANSEN, JR.
by Richard E. Hosley
His Attorney.

United States Patent Office 2,777,326
Patented Jan. 15, 1957

2,777,326

ELECTRICAL TEMPERATURE MEASURING APPARATUS

Frederic P. Schwieg, Nahant, and Albert Hansen, Jr., Lynn, Mass., assignors to General Electric Company, a corporation of New York Application March 20, 1953, Serial No. 343,577

13 Claims. (Cl. 73—362)

Our invention relates to electrical measuring apparatus of the self-balancing impedance bridge type, in which the electrical impedance of at least one bridge element varies as a function of a quantity to be measured, such as temperature.

In a form of such apparatus heretofore commonly used, the bridge is balanced by adjusting the position of a movable tap along a slide-wire resistor, to change the impedance ratio of two arms of the bridge. For long life and reliable operation under conditions encountered in industrial usage, such sliding contacts are undesirable. Various other balancing arrangements have sometimes been employed; but, in general, these introduce other disadvantages, such as substantial difficulties due to electrostatic or electromagnetic pickup, voltages in quadrature phase relation to the desired signal, and the like.

A principal object of my invention is to provide improved electrical measuring apparatus without the aforementioned disadvantages, which is simple, accurate, rugged, reliable in operation, and economical to manufacture. Other objects and advantages will appear as the description proceeds.

Briefly stated, in accordance with one aspect of my invention, we provide an impedance bridge having two arms which respectively comprise two secondary windings on a magnetic core. Alternating current is supplied to a primary winding on the same core to energize the bridge. The magnetic core also has a gap containing a wound rotor, which is adjustable in angular position to adjust the amplitude and phase of voltage induced in the rotor winding. The rotor winding is connected in series with a voltage-responsive means for detecting bridge unbalance, and balance is obtained by adjusting the angular position of the rotor to supply zero voltage to the responsive means. A servomotor is provided for automatically making the balancing adjustments. Other aspects of my invention relate to compensation and calibration means hereinafter described.

Our invention will be better understood from the following description taken in connection with the accompanying drawing, and its scope will be pointed out in the appended claims. In the drawing, Fig. 1 is a schematic illustration of a preferred embodiment of my invention, Fig. 2 is a simplified circuit diagram of the Fig. 1 apparatus, and Fig. 3 is a simplified diagram of an alternative circuit.

Referring now to Figs. 1 and 2 of the drawing, a magnetic core 1 preferably comprises a stack of substantially D-shaped laminations, which may be held together and supported by three posts respectively located at 2, 3, and 4. The D-shaped core has a gap in the center of its straight side, as shown, and within this gap there is a rotor 5 which preferably comprises a stack of disc-shaped laminations of magnetic material. The rotor is generally cylindrical in shape, and is rotatable about its axis aligned transversely across the center of the gap in the magnetic core 1.

A primary winding and two secondary windings are on the straight side of the D-shaped core. The primary winding consists of two similar series-connected parts 6 and 7 respectively located on opposite sides of the gap, as shown. Likewise, one secondary winding consists of two similar series-connected parts 8 and 9, and the other secondary winding consists of two similar series-connected parts 10 and 11. The two parts of each secondary winding are also respectively located on opposite sides of the gap, as shown. Preferably, the primary and secondary windings respectively comprise three wires which are first twisted together, and then wound on the core. This winding arrangement provides substantial advantages for the economical manufacture of many units having substantially identical performance.

When alternating current is supplied to the primary winding, to energize the bridge as hereinafter explained, identical voltages should be induced in the two secondary windings. This is assured by dividing each winding into two parts, respectively located on opposite sides of the gap, as described, and by twisting the windings together. For example, when the secondary windings are not twisted together, it has been found that operating characteristics of the apparatus are critically dependent upon a precise location of the windings on the magnetic core. Under such circumstances, the manufacture of many units having acceptably identical operating characteristics would require location and adjustment of the windings on the core to a precision which would substantially increase the manufacturing cost. This disadvantage is avoided by twisting the secondary windings together. If desired, satisfactory operation can be obtained by merely winding the primary winding over the secondary windings, but a better winding space factor is obtained if all three windings are twisted together in the manner described.

Rotor 5 is provided with a winding 12 in which there is induced a voltage having an amplitude and phase which depends upon the angular position of the rotor. When the rotor is in its neutral position, the axis of winding 12 is perpendicular to the magnetic flux across the gap in core 1, and consequently there is no induced voltage in winding 12. When rotor 5 is turned away from its neutral position, magnetic flux passing across the gap links winding 12, and induces therein a voltage having a phase which depends upon the direction in which the rotor was turned. This induced voltage is used for rebalancing the bridge, as hereinafter explained.

The impedance bridge also comprises two impedance elements 13 and 14 connected in a series circuit loop with the two secondary windings, as shown. Element 13 has an electrical impedance which varies as a function of the quantity to be measured; for example, element 13 may have an electrical resistance which varies as a function of temperature. Preferably, the resistance of element 14 is slightly greater than the mean resistance of element 13. An adjustable resistor 15 may be connected in parallel with element 14, as shown, so that the resistance of element 14 and resistor 15 in parallel can be adjusted to substantial equality with the mean resistance of element 13.

Resistors 16 and 17 may also be connected in series with elements 13 and 14, respectively, as shown. These are range-changing resistors, the value of which determines the temperature or impedance range covered by the instrument. Conventional provisions may be made for substituting resistances of various values at 16 and 17 to cover various ranges, as desired.

An amplifier 18 is connected in series with winding 12, as shown, between the circuit junction of impedance elements 13 and 14 and the circuit junction of the two secondary windings. Responsive to bridge unbalance voltages, amplifier 18 provides alternating current to the control winding 19 of a two-phase induction servomotor 20, the field winding 21 of which is supplied with alternating current from supply connections 22. Primary winding 6—7 is also supplied with alternating current from supply connections 22, preferably through a transformer 23. The turns ratio of transformer 23 may be such that the bridge is energized with about 4 volts, for example.

The phase characteristics of amplifier 18 are such that the current supplied to winding 19 is substantially in phase quadrature to the current supplied to winding 21, whereby servomotor 20 rotates in a direction depending upon the phase of the unbalanced voltage supplied to the amplifier by the bridge circuit. Servomotor 20 is connected to rotor 5 by a suitable mechanical linkage, so that operation of servomotor 20 adjusts the angular position of rotor 5, and thereby adjusts the amplitude and phase of the voltage induced in winding 12 to bring the bridge automatically into balance.

Assume, for example, that the apparatus is used to measure temperature over the range 100° to 400°, and assume that the resistance of element 13 is a linear function of temperature within this range. Then, element 13 has its mean resistance value when its temperature is 300°. Also assume that resistor 15 is adjusted to balance the bridge under these conditions, with rotor 5 in its neutral position in which there is no induced voltage in winding 12. Since the bridge is balanced, zero voltage is supplied to amplifier 18, and the rotor of servomotor 20 remains stationary.

Now assume that the temperature changes, and that the resistance of element 13 changes accordingly. This unbalances the bridge, and thereby provides an error signal alternating voltage to amplifier 18, which in turn operates servomotor 20 to change the angular position of rotor 5. This action continues until the voltage induced in winding 12 exactly equals and opposes the voltage produced by the change in resistance of element 13, whereupon zero voltage is again supplied to amplifier 18, and servomotor 20 stops. In this way, at each change in the temperature of element 13, the angular position of rotor 5 is automatically readjusted to keep the bridge in balance.

Since rotor 5 is automatically adjusted, as described, to an angular position which corresponds to the temperature of element 13, temperature readings may be made by noting the angular position of the rotor. To display continually the temperature values, a pointer arm 24 is preferably attached to the rotor 5, through its supporting shaft, for example. The outer end of pointer 24 may cooperate with a suitably calibrated scale 25. If desired, a pen or other writing instrument may be attached to the outer end of arm 24, and this pen may draw a curve on a paper chart in the conventional manner to provide a permanent record of temperature variations.

As has been explained, adjustable resistor 15 provides means for adjusting the temperature value at which rotor 5 assumes its neutral position, which corresponds to the mid-scale position of pointer 24. Other means are needed for adjusting the temperature range; that is, the temperature change from the mid-scale value necessary to produce full scale deflection of pointer 24 in one direction or the other from its mid-scale position. As has already been explained, major changes of range are made by substituting resistors of various values at 16 and 17. Such substitutions do not affect the scale distribution of the instrument except by changing the multiplying factor. An additional fine adjustment of range is needed to make the instrument indications conform precisely to a predetermined scale marking. This fine adjustment is made by means of an adjustable resistor 26 connected in parallel with winding 12, as shown. If desired, a resistor 27 may be connected in series with winding 12, as shown in Fig. 2, or, preferably, 27 may merely represent the resistance of the winding. Resistors 26 and 27 in effect constitute an adjustable voltage divider, so that only a portion of the voltage induced in winding 12 is effective to rebalance the bridge. Consequently, due to the presence of resistor 26, rotor 12 must rotate through a larger angle to rebalance the bridge than would otherwise be the case, and the amount of such extra rotation required is a function of the resistance of resistor 26. Thus, resistor 26 provides means for making fine adjustments in the temperature range represented by a full scale movement of the pointer.

In practice, element 13 may be located at a considerable distance from the remainder of the apparatus, and be connected thereto by leads 28, which may be several hundred feet in length, for example. Preferably, three leads are employed, as shown in Fig. 1. The lower lead is a ground connection, which joins the other two leads at a point near resistor 13, as shown. As a result of this arrangement, an increase in the length of the leads adds substantially equal amounts of resistance to each side of the bridge, and thus does not materially affect the bridge balance or the instrument scale distribution. Any small unbalance of the lead resistances can be compensated by readjustment of adjustable resistors 15 and 26.

However, any capacitance unbalance present in leads 28 or element 13, represented in Fig. 2 by capacitor 29, may present a problem, since this capacitance conducts current in quadrature phase relation to the current through element 13, and thus provides to amplifier 18 a voltage in quadrature to the error signal voltage. This quadrature voltage is undesirable, since it tends to mask the signal, and to reduce the sensitivity of the apparatus. Therefore, a feature of our invention is the means which we provide for substantially balancing out the undesirable quadrature voltage.

A part of this balancing means comprises an adjustable capacitor 30 connected in parallel with impedance element 14, as shown. Capacitor 30 can be adjusted to exactly balance and cancel out the effects of capacitor 29 for one particular resistance value of element 13. For example, such a balance may be obtained at the mean resistance value of element 13, with rotor 5 in its neutral, or mid-scale, position. However, this alone may not sufficiently reduce the undesirable quadrature voltage at other positions of the rotor, corresponding to other resistance value of element 13.

To further balance out the capacitance effects, we provide an adjustable resistor 31 connected in series between winding 12 and amplifier 18. A capacitor 32 is connected across resistor 31 and winding 12 in series, as shown. This provides a phase shift between the voltage induced in winding 12 and the error signal voltage applied to amplifier 18. The amount of this phase shift can be adjusted by adjusting the value of resistor 31, or alternatively, by adjusting the value of capacitor 32. This makes it possible to exactly balance out the capacitive effects at two other positions of the rotor 5; for example, the position of full clockwise deflection of pointer 24, and the position of full counterclockwise deflection of pointer 24. Thus, exact compensation of the capacitance effects is obtained at three widely separated points of the temperature scale. It has been found that this adjustment can provide complete compensation of the capacitive effects over the entire instrument range.

Where the amplifier can tolerate a considerable amount of quadrature voltage without serious loss of sensitivity, the capacitance compensation can be omitted, and the circuit can be simplified, as shown in Fig. 3, for example.

In Fig. 3, the elements numbered 6 through 13, 16 through 18, and 27 are identical to the like-numbered elements in Figs. 1 and 2. Element 14' is preferably a spool-type resistor made to have exactly the same resistance as element 13. Elements 15 and 30 are omitted, and the compensation network connected to rotor winding 12 is modified. A potentiometer 33 and a resistor 34 are connected in series across winding 12, as shown. Amplifier 18 is connected to the adjustable tap 35 of potentiometer 33. The fine adjustments of range are made by adjusting the position of tap 35.

It will be understood that our invention is not limited to the specific embodiment herein illustrated and described, and that the following claims are intended to cover all changes and modifications which do not depart from the true spirit and scope of the invention.

What we claim as new and desire to secure by Letters Patent of the United States is:

1. Condition responsive apparatus, comprising a magnetic core having a gap, a rotor within said gap, a primary winding and a pair of secondary windings on said core, a winding on said rotor, first and second impedance elements, said secondary windings and said impedance elements being connected together in a series circuit loop to form an impedance bridge, one of said impedance elements having a magnitude of impedance which varies as a function of changes in said condition to unbalance said bridge, connections for applying alternating current to said primary winding to energize said bridge, voltage-responsive means and a resistor connected in series with said rotor winding between the circuit junction of said two secondary windings and the circuit junction of said two impedance elements, said voltage-responsive means including means for moving said rotor to rebalance said bridge and a capacitor connected across said resistor and said rotor winding in series.

2. Condition responsive apparatus, comprising a magnetic core having a gap, a rotor within said gap, a primary winding and a pair of secondary windings on said core, a winding on said rotor, first and second impedance elements, said secondary windings and said impedance elements being connected together in a series circuit loop to form an impedance bridge, one of said impedance elements having a magnitude of impedance which varies as a function of changes in said condition to unbalance said bridge, connections for applying alternating current to said primary winding to energize said bridge, voltage-responsive means and a first adjustable resistor connected in series with said rotor winding between the circuit junction of said two secondary windings and the circuit junction of said two impedance elements, said voltage-responsive means including means for moving said rotor to rebalance said bridge, a capacitor connected across said first resistor and said rotor winding in series, and a second adjustable resistor connected in parallel with said rotor winding.

3. Electrical measuring apparatus, comprising a magnetic core having a gap, a rotor within said gap, a primary winding and a pair of secondary windings on said core, a winding on said rotor, first and second resistance elements, said first resistance element having an electrical resistance which varies as a function of a quantity to be measured, said secondary windings and said resistance elements being connected together in a series circuit loop to form an impedance bridge, an adjustable capacitor connected in parallel with said second resistance element, connections for applying alternating current to said primary winding to energize said bridge, voltage-responsive means and a first adjustable resistor connected in series with said rotor winding between the circuit junction of said two secondary windings and the circuit junction of said two resistance elements, said voltage-responsive means including means for moving said rotor to rebalance said bridge, a capacitor connected across said first adjustable resistor and said rotor winding in series, and a second adjustable resistor connected in parallel with said rotor winding.

4. Apparatus for measuring temperature, comprising a D-shaped magnetic core having a gap at the center of its straight side, a rotor within said gap, a primary winding and a pair of secondary windings on the straight side of said core, each of said primary and secondary windings consisting of two similar series-connected parts respectively located on opposite sides of said gap, said primary and secondary windings respectively comprising three wires twisted together, a winding on said rotor, first and second resistance elements, said first resistance element having an electrical resistance which varies as a function of its temperature, said secondary windings and said resistance elements being connected together in a series cricuit loop to form an impedance bridge, an adjustable capacitor connected in parallel with said second resistance element, connections for applying alternating current to said primary winding to energize said bridge, an amplifier and a first adjustable resistor connected in series with said rotor winding between the circuit junction of said two secondary windings and the circuit junction of said two resistance elements, a capacitor connected across said first adjustable resistor and said rotor winding in series, a second adjustable resistor connected in parallel with said rotor winding, servomotor means operated by said amplifier to rotate said rotor and thereby balance said bridge, and means displaying the angular position of said rotor.

5. Apparatus for measuring temperature, comprising a D-shaped magnetic core having a gap at the center of its straight side, a rotor within said gap, a primary winding and a pair of secondary windings on the straight side of said core, each of said primary and secondary windings consisting of two similar series-connected parts respectively located on opposite sides of said gap, said primary and secondary windings respectively comprising three wires twisted together, a winding on said rotor, first and second resistance elements, said first resistance element having an electrical resistance which varies as a function of its temperature, said secondary windings and said resistance elements being connected together in a series circuit loop to form an impedance bridge, connections for applying alternating current to said primary winding to energize said bridge, one end of said rotor winding being connected to the circuit junction of said two secondary windings, a potentiometer and a resistor in series connected in parallel with said rotor winding, said potentiometer having an adjustable tap, an amplifier having input terminals respectively connected to said tap and to the circuit junction of said two resistance elements, servomotor means operated by said amplifier to rotate said rotor and thereby balance said bridge, and means displaying the angular position of said rotor.

6. Condition responsive apparatus, comprising a D-shaped magnetic core having a gap at the center of its straight side, a rotor within said gap, a primary winding and a pair of secondary windings on said core, first and second impedance elements, first and second range-changing resistors, said secondary windings, impedance elements and range-changing resistors being connected together in a series circuit loop to form an impedance bridge one of said impedance elements having a magnitude of impedance which varies as a function of changes in said condition to unbalance said bridge, connections for applying alternating current to said primary winding to energize said bridge, one end of said rotor winding being connected to the circuit junction of said two secondary windings, a potentiometer and a resistor in series connected in parallel with said rotor winding, said potentiometer having an adjustable tap, an amplifier having input terminals respectively connected to said tap and to the circuit junction of said two impedance elements, servomotor means operated by said amplifier to rotate said rotor and thereby balance said bridge, and means displaying the angular position of said rotor.

7. In impedance bridge apparatus having a pair of bridge terminals and including a condition responsive resistor in one arm thereof whereby a change in the magnitude of said condition causes the bridge to become unbalanced and develop an error voltage across said terminals, the combination of a magnetic core member having a gap therein, a primary winding and a pair of secondary windings wound on a portion of said core member, said secondary windings forming impedance elements in adjacent arms of said bridge, said primary winding and each of said secondary windings consisting of two similar series-connected parts located respectively on opposite sides of said gap, said primary winding having connections for applying alternating current to energize the bridge, said primary winding directing magnetic flux across said gap when said bridge is energized, a rotor movably mounted within said gap, said rotor having a winding thereon adapted to have a voltage induced therein by said magnetic flux, the amplitude and phase of said induced voltage being dependent upon the angular position of said rotor, connections to said rotor winding for opposing said induced voltage to said error voltage including motor means responsive to any difference between said voltages and operating to position said rotor in an angular position whereby said voltages are equal, and means coupled to said motor means for indicating the magnitude of said condition as a function of the angular position of said rotor.

8. The combination defined by claim 7 wherein each of said secondary windings is formed respectively of first and second insulated conductors wound on said core, said conductors being twisted together throughout their length.

9. The combination defined by claim 8 wherein said primary winding is formed of a third insulated conductor wound on said core, said first, second and third conductors being twisted together throughout their length.

10. The combination defined by claim 8 wherein said portion of said core member includes a pair of aligned substantially straight sections, said sections being spaced apart to form said gap and having their ends facing said gap in the form of arcuate pole faces, said rotor being in the form of a cylindrical magnetic core member positioned centrally in said gap so as to form a pair of air gaps with said arcuate pole faces, and said rotor winding is mounted on said rotor such that portions thereof move transversely in said air gaps upon motion of said rotor.

11. In impedance bridge apparatus having a pair of bridge terminals and including a condition responsive resistor in one arm thereof whereby a change in the magnitude of said condition causes the bridge to become unbalanced and develop an error voltage across said terminals, the combination of a magnetic core member having a gap therein, a primary winding and a pair of secondary windings wound on a portion of said core member, said secondary windings forming impedance elements in adjacent arms of said bridge, said primary winding and each of said secondary windings consisting of two similar series-connected parts located respectively on opposite sides of said gap, said primary winding having connections for applying alternating current to energize the bridge, said primary winding directing magnetic flux across said gap when said bridge is energized, a rotor movably mounted within said gap, said rotor having a winding thereon adapted to have a voltage induced therein by said magnetic flux, the amplitude and phase of said induced voltage being dependent upon the angular position of said rotor, connections to said rotor winding including an adjustable resistor connected in parallel with said rotor winding for opposing a portion of said induced voltage to said error voltage, said connections also including motor means responsive to any difference between said opposed voltages and operating to position said rotor in an angular position whereby said opposed voltages are equal, and means coupled to said motor means for indicating the magnitude of said condition as a joint function of the angular position of said rotor and the magnitude of the resistance of said adjustable resistor.

12. In impedance bridge apparatus having a pair of bridge terminals and including a condition responsive resistor in one arm thereof whereby a change in the magnitude of said condition causes the bridge to become unbalanced and develop an error voltage across said terminals, the combination of a magnetic core member having a gap therein, a primary winding and a pair of secondary windings wound on a portion of said core member, said secondary windings forming impedance elements in adjacent arms of said bridge, said primary winding and each of said secondary windings consisting of two similar series-connected parts located respectively on opposite sides of said gap, said primary winding having connections for applying alternating current to energize the bridge, said primary winding directing magnetic flux across said gap when said bridge is energized, a rotor movably mounted within said gap, said rotor having a winding thereon adapted to have a voltage induced therein by said magnetic flux, the amplitude and phase of said induced voltage being dependent upon the angular position of said rotor, connections to said rotor winding including a potentiometer having an adjustable tap connected in parallel with said rotor winding for opposing a portion of said induced voltage to said error voltage, said connections also including motor means responsive to any difference between said opposed voltages and operating to position said rotor in an angular position whereby said opposed voltages are equal, and means coupled to said motor means for indicating the magnitude of said condition as a joint function of the angular position of said rotor and the position of said adjustable tap.

13. The combination defined by claim 12 wherein said rotor has a predetermined angular position within said gap wherein no voltage is induced in said rotor winding.

References Cited in the file of this patent

UNITED STATES PATENTS

| | | |
|---|---|---|
| 940,747 | Sumpner | Nov. 23, 1909 |
| 2,053,154 | La Pierre | Sept. 1, 1936 |
| 2,097,226 | Miyazaki | Oct. 26, 1937 |
| 2,219,939 | Rich | Oct. 29, 1940 |
| 2,289,673 | Neumeister et al. | July 14, 1942 |
| 2,368,701 | Borden | Feb. 6, 1945 |
| 2,617,864 | Johnson | Nov. 11, 1952 |